(12) United States Patent
Ottersbach et al.

(10) Patent No.: US 8,844,483 B2
(45) Date of Patent: Sep. 30, 2014

(54) CLAMPING DISK AND CAM ADJUSTING UNIT

(75) Inventors: Rainer Ottersbach, Aurachtal (DE);
Christoph Betz, Hausen/Oberfr (DE);
Rudiger Herzog, Hirschaid (DE);
Stefan Christel, Wachenroth (DE);
Stefan Sebald, Waischenfeld (DE); Uwe Stollberger, Staffelbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 128 days.

(21) Appl. No.: 13/577,333

(22) PCT Filed: Feb. 8, 2011

(86) PCT No.: PCT/EP2011/051796
§ 371 (c)(1),
(2), (4) Date: Aug. 6, 2012

(87) PCT Pub. No.: WO2011/098441
PCT Pub. Date: Aug. 18, 2011

(65) Prior Publication Data
US 2012/0304946 A1 Dec. 6, 2012

(30) Foreign Application Priority Data
Feb. 9, 2010 (DE) .......................... 10 2010 007 488

(51) Int. Cl.
*F01L 1/34* (2006.01)
*F16B 21/18* (2006.01)
*F16B 21/20* (2006.01)

(52) U.S. Cl.
CPC ................. *F16B 21/18* (2013.01); *F16B 21/20* (2013.01)
USPC ................................... 123/90.17; 123/90.15

(58) Field of Classification Search
CPC ............ F01L 2001/34453; F01L 1/205; F01L 2001/34469; B60B 7/12
USPC ................................ 123/90.15, 90.17, 90.31
See application file for complete search history.

(56) References Cited

U.S. PATENT DOCUMENTS

| | | | |
|---|---|---|---|
| 2,131,948 A | 10/1938 | Graham | |
| 3,102,508 A | 9/1963 | Smith, Jr. | |
| 4,183,280 A | 1/1980 | Hashimoto | |
| 5,195,860 A | 3/1993 | Steyn | |
| 5,713,692 A | 2/1998 | McCarrick et al. | |

FOREIGN PATENT DOCUMENTS

| | | |
|---|---|---|
| DE | 2105990 | 8/1972 |
| DE | 19850048 | 5/2000 |
| DE | 19936708 | 2/2001 |
| DE | 102005042346 | 3/2007 |
| DE | 102006036034 | 2/2008 |
| DE | 102008013966 | 9/2009 |
| DE | 4444922 | 3/2012 |
| EP | 0019361 | 11/1980 |
| EP | 0611008 | 8/1994 |
| EP | 1050665 | 11/2000 |
| EP | 1693588 | 2/2006 |
| GB | 359836 | 10/1931 |
| GB | 1416067 | 12/1975 |

*Primary Examiner* — Zelalem Eshete
(74) *Attorney, Agent, or Firm* — Volpe and Koenig, P.C.

(57) ABSTRACT

A clamping disk (1) for the non-positive connection of components in a cam adjusting system, a cam adjusting system (15) having a clamping disk (1) and a method for checking the mounting of the clamping disk (1) are provided. The clamping disk (1) has an essentially circular base body (2) which has at least one friction surface for a contact partner. The base body (2) is axially penetrated by a material recess (10). The mounting of the clamping disk (1) can be controlled in a simple manner by distance measuring.

14 Claims, 2 Drawing Sheets

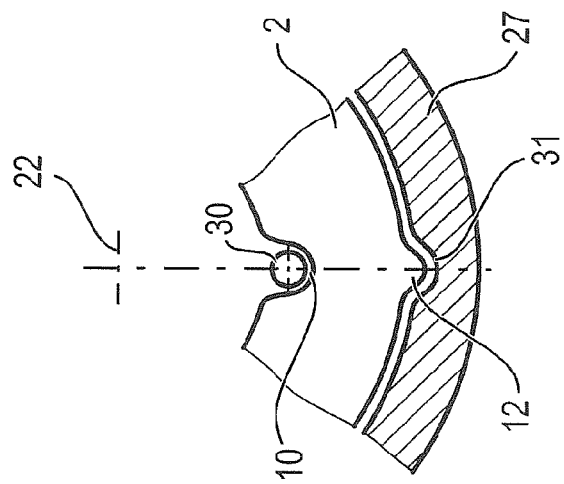
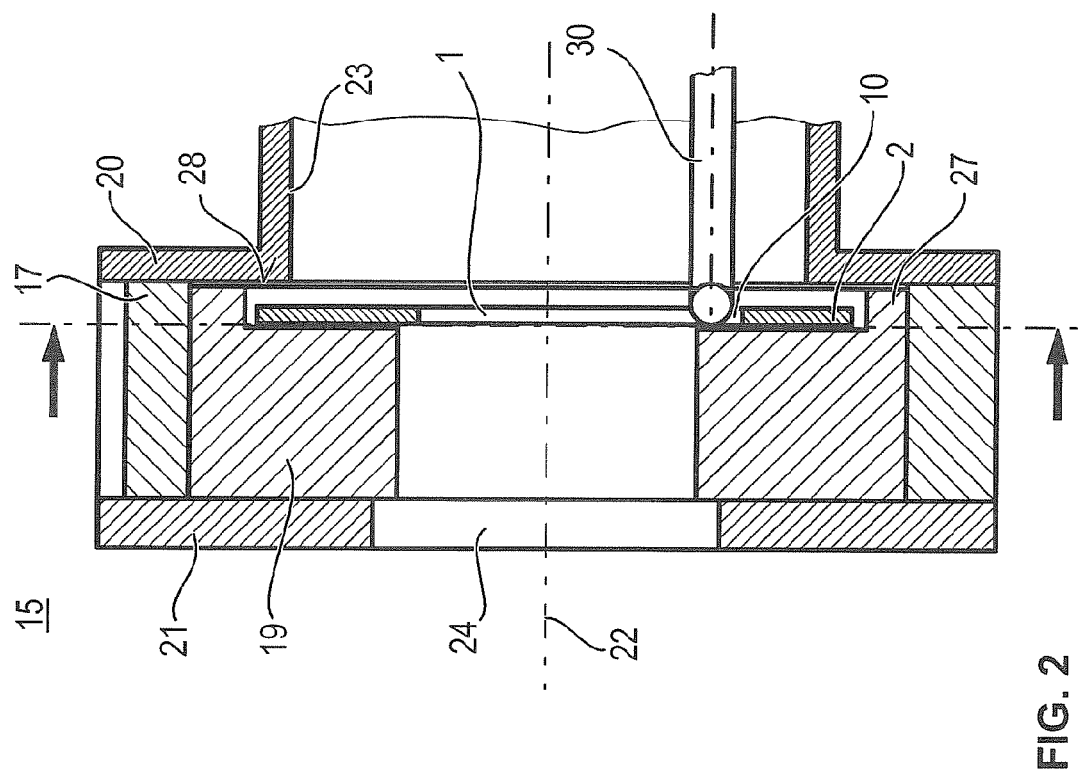

CLAMPING DISK AND CAM ADJUSTING UNIT

FIELD OF THE INVENTION

The invention relates to a clamping disk for the non-positive connection of components in a camshaft adjustment system, in particular, for a non-positive connection of a camshaft adjusting unit comprising a rotor and a stator to a camshaft of an internal combustion engine. The invention also relates to a camshaft adjusting unit with such a clamping disk. In addition, the invention relates to a method for checking the installation of the clamping disk.

BACKGROUND

A camshaft adjustment system is used for adjusting the phase position between a camshaft and a crankshaft in an internal combustion engine. For this purpose, a rotor is typically mounted in a stator so that it can move with a rotating motion. The stator of the camshaft adjustment system is locked in rotation with the crankshaft. The rotor is locked in rotation with the camshaft. The phase position between the crankshaft and the camshaft is adjusted by means of a relative rotation of the rotor relative to the stator. For common camshaft adjustment systems of today, the rotor is rotated hydraulically relative to the stator.

A central screw that presses the rotor arranged inside the stator against an end face of the camshaft is one technical possibility for connecting the camshaft adjustment system to the crankshaft. Here, the central screw engages in an internal thread of the camshaft.

Such a camshaft adjustment system, wherein the connection to the camshaft is provided by means of a central screw, is proposed, for example, in DE 10 2006 036 034 A1. The ends of the camshaft and the drive element of the camshaft adjustment system have uneven microscopic or macroscopic features, so that a positive-fit connection is established in addition to a non-positive connection for transferring the driving moment.

For increasing the adhesive friction between the components that are connected with a non-positive fit, friction or clamping disks are also used whose material or their surface is selected according to the friction or contact partners. A clamping disk can reduce the normal force required for the coupling and thus the load on the clamped components.

Known friction or clamping disks are constructed, for example, as thin steel foils with a friction increasing and/or wear-resistant hard coating. Hard coatings are known, for example, from DE 10 2008 013 966 A1 or DE 19 850 048 A1.

The most cost-effective procedure is to install a clamping disk after the camshaft adjusting unit has already been assembled. The clamping disk is mounted on the camshaft side on the rotor located in the stator. The camshaft adjusting unit with the mounted clamping disk is then connected to the camshaft by means of a central screw.

For transferring the load moment and guaranteeing the axial position of the camshaft adjusting unit relative to the camshaft flange, exactly one clamping disk must be provided to which the geometry of the components is tuned. By means of this geometry, after successful installation, the desired normal force on the clamping disk is produced, so that a non-positive or friction-fit connection of the camshaft adjusting unit to the camshaft is guaranteed. Such a clamping disk has, for example, a thickness between 0.1 and 1.0 mm. Therefore, the installation can easily be performed incorrectly by inserting no or multiple clamping disks. This has the undesirable result that the camshaft adjustment system is not functional.

Furthermore, in the transport of the preassembled camshaft adjusting unit on the motor and in the installation on the camshaft, the inserted clamping disk must remain as fixed as possible. On the other hand, the clamping disk is a wear part, so that the simplest possible disassembly must also be given.

SUMMARY

The object of the invention is to provide a clamping disk of the type named above, as well as a camshaft adjusting unit with inserted clamping disk, wherein the simplest possible installation inspection is given. Another object of the invention is to provide a corresponding method for inspecting the installation of the clamping disk in the camshaft adjusting unit.

The stated objective is met according to the invention by a clamping disk for the non-positive connection of components in a camshaft adjustment system that has an essentially circular ring-shaped base body with at least one friction surface to a contact partner. Here it is provided that the base body is cut through in the axial direction by a material opening.

Here, in a first step, the invention starts from the idea that a mounted clamping disk can be determined by a change in distance relative to the rotor. By means of such a measurement, it can be controlled during assembly whether one, multiple, or no clamping disks are installed. Here however, determining a suitable reference point for the measurement is problematic. For example, if the inner diameter of the rotor on which the clamping disk is placed is greater than the inner diameter of the clamping disk, then there is no reference point to be able to reliably determine the thickness of the mounted clamping disk as a change in distance.

In a second step, the invention now starts from the idea of making the support surface of the rotor accessible for a thickness or distance measurement despite a clamping disk on top of this surface. This is achieved in that the base body of the clamping disk is cut through in the axial direction by a material opening. The distance to the support surface of the rotor can be reliably measured through such an opening. By measuring the distance relative to the clamping disk in addition to the opening, the thickness of the mounted clamping disk can then be determined. In particular, this makes it possible to determine whether one clamping disk, no clamping disks, or multiple clamping disks are mounted.

The two adjacent distance measurements in the opening and on the clamping disk can be performed easily from the side of the camshaft. There, the camshaft adjusting unit naturally has a borehole for passing through the camshaft. Through this borehole, free access to at least a sub-area of the clamping disk is guaranteed.

The material opening can be constructed as a cutout, as a notch, as a borehole, or as a recess in the base body. The material opening is dimensioned so that the distance measurement to the underlying surface of the rotor can be performed through this opening. If, for example, a mechanical measuring sensor is used to measure the distance, then the material opening must be dimensioned so that the measuring sensor reaches the surface of the rotor through this opening. On the other hand, if the distance measurement is performed by means of a propagation-time measurement, especially by means of laser radiation, then smaller dimensions of the material opening can be selected.

Preferably, the material opening is constructed as a notch in the inner circumference of the base body. This makes it possible for there still to be simple production of the clamping disk. In addition, free access of the material opening for the distance measurement from the camshaft side is guaranteed.

The clamping disk itself is produced, for example, from a steel. A friction coating, bond coating, or hard layer can be applied onto the contact surfaces. A positive-fit connection to the contact or friction partner can be established by means of this coating or layer and, in particular, by means of micro or macro roughness in this coating or layer. Ceramic layers, nitrides, or carbides are suitable. Incidentally, for the invention it is not ruled out that, in addition to a non-positive connection, there is also a positive-fit connection between the clamping disk, the rotor, and/or the camshaft, in order to guarantee a rotationally locked attachment. For example, the clamping disk can be inserted into a multi-sided shape locked in rotation on the rotor or the camshaft side with a corresponding geometry.

In another advantageous construction, the base body of the clamping disk comprises a positioning mechanism that is arranged in a specified angular position relative to the material opening. If a distance measurement to the surface of the rotor is to be performed through the material opening of the clamping disk, then it is recommended to provide a defined angular position of the material opening relative to the camshaft adjusting unit for simple handling of this control process. For the distance measurement, initially the preassembled camshaft adjusting unit is oriented in its angular position relative to the outer measurement system. By means of the positioning mechanism, a defined angular position of the inserted clamping disk relative to the camshaft adjusting unit is then realized. Because the positioning mechanism and the material opening also have a defined angular position relative to each other, when the camshaft adjusting unit is aligned, the material opening of the clamping disk is also located in a defined angular position relative to the outer measurement system. The sensors for the distance measurement therefore no longer need to be calibrated for the installation inspection.

The positioning mechanism is preferably constructed as a positioning tab. In one especially preferred construction, this positioning mechanism extends radially outward on the outer circumference. Such a positioning tab could be inserted, for example, into a corresponding notch or recess in the rotor, wherein the clamping disk is brought into a defined starting position relative to the rotor. Here it is to be assumed that the rotor is always located in a specified rotational position in the mounted camshaft adjusting unit.

Instead of positioning tabs, latches, plugs, or other coupling mechanisms could also be provided that couple with complementary elements of the rotor. In particular, the rotor could also have a recess in which a clamping disk adapted geometrically to this shape can be partially inserted.

Preferably, the base body has a flattened section on the inner circumference for disassembly of the clamping disk. The clamping disk can be lifted from the rotor by means of the flattened section with a suitable tool and removed toward the camshaft side. Preferably, the flattened section is arranged opposite the positioning mechanism.

Advantageously, the notch and the radially outward extending positioning tab are arranged at the same angular position of the base body. This avoids material weakening of the clamping disk due to the material opening.

The objective is further met according to the invention by a camshaft adjusting unit for an internal combustion engine that comprises a rotor mounted rotationally locked within a stator, wherein a clamping disk of the type described above is positioned on the side of the rotor facing the camshaft.

Additional, advantageous constructions are found in the subordinate claims directed toward a camshaft adjusting unit. Here, the advantages noted for the clamping disk can be transferred analogously to the camshaft adjusting unit.

In one variant of the camshaft adjusting unit, the inner diameter of the rotor is greater than the inner diameter of the base body of the clamping disk. Through this typical geometry it is not possible to measure the distance to the surface of the rotor when the clamping disk is placed on top. Likewise, such a measurement is not possible if the inner diameter or an inner section of the rotor is not freely accessible due to otherwise specified constructions of the camshaft adjusting unit. Such a distance measurement is, however, made possible by the material opening of the clamping disk described above, wherein a simple assembly inspection is given relative to the clamping disk.

In another advantageous construction, the rotor overlaps the clamping disk at least in some sections in the axial direction, wherein a radially outward extending positioning tab of the clamping disk is inserted into a recess of the overlapping section of the rotor. Through the radial insertion of the positioning tab into the corresponding recess of the overlapping rotor section, a simple assembly of the clamping disk is guaranteed. At the same time, after assembly the clamping disk is positioned overall at the correct angle relative to the rotor and by means of its fixed rotational position specified in the preassembled state relative to the stator also at the correct angle relative to the camshaft adjusting unit.

In another preferred variant, the stator has, on the camshaft side, a side cover with an axial borehole for holding the camshaft. If the inner diameter of the borehole is selected smaller than the largest circumscribing outer diameter of the clamping disk, then the clamping disk is preferably inserted into an undercut of the side cover. For assembly, the clamping disk is bent and inserted to the rotor through the borehole. After being placed on the rotor, the clamping disk then extends in the radial direction past the undercut of the side cover, wherein a captive mechanism for transport is provided. The side cover is in the way of the clamping disk on the side of the camshaft. Here, the clamping disk is advantageously locked with a positive-fit connection on axially extending rotor sections or clamped radially with a friction fit.

Furthermore, the objective is met according to the invention by a method for inspecting the assembly of a clamping disk in a camshaft adjusting unit. For inspecting the assembly of the clamping disk, it is here provided to orient the camshaft adjusting unit initially into the angular position, then to bring the clamping disk onto the rotor on the side of the camshaft, to measure, on the camshaft side, a difference in distance between the surface of the clamping disk and the surface of the rotor detected through the material opening of the clamping disk, to compare the measured difference in distance with a desired thickness of the clamping disk, and to separate out the preassembled camshaft adjusting unit if it is determined that the difference in the distance deviates from the desired thickness outside of a tolerance value.

To allow a simple testing of the mounted clamping disk for an oriented camshaft adjusting unit in an outer measurement system, the clamping disk is placed as described above with reference to the positioning mechanism advantageously with a defined angular position relative to the rotor. In another variant that is preferred because it is economical and simple, the difference in distance is measured through the borehole of the side cover by means of a measuring sensor oriented in the angular position.

BRIEF DESCRIPTION OF THE DRAWINGS

Embodiments of the invention will be explained in more detail with reference to the drawings. Shown are.

DETAILED DESCRIPTION OF THE PREFERRED EMBODIMENTS

Figure 1:
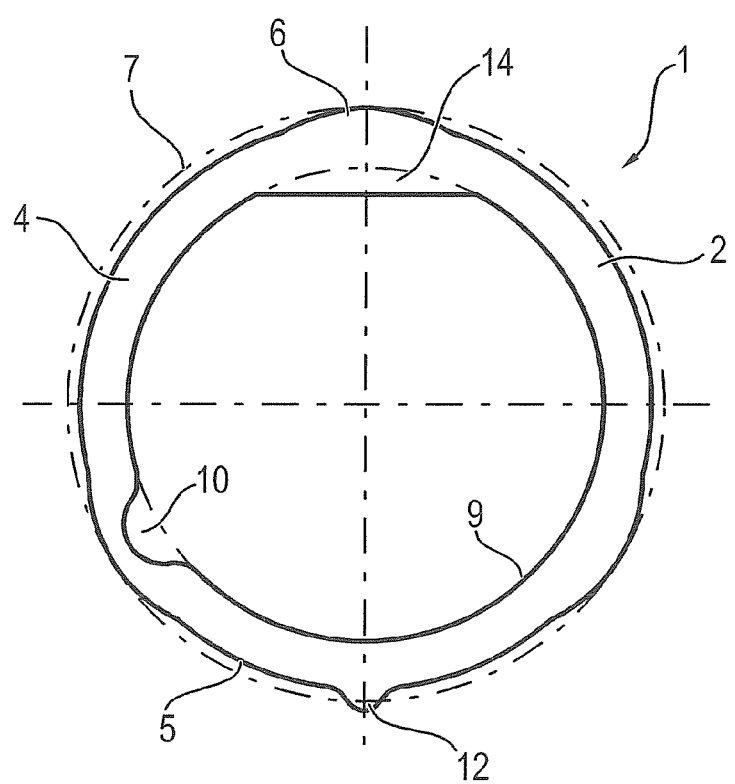
FIG. 1 a clamping disk with a notch on the inner circumference for performing a distance measurement, FIG. 2 in a cross section, a camshaft adjusting unit with a rotor and a stator, wherein a clamping disk according to FIG. 2 is placed on the rotor, and FIG. 3 a detailed view of the notch of the clamping disk.

FIG. 1 shows a clamping disk 1 for a positive-fit and/or non-positive connection of a camshaft adjusting unit to a camshaft of an internal combustion engine. The clamping disk 1 has an essentially circular ring-shaped base body 2 on which a friction-increasing hard layer 4 is applied. The outer circumference of the base body 2 deviates slightly from a circular shape. A total of three notches 6 are provided at an angular distance of 120° from each other. The largest circumscribing diameter 7 of the base body 2 is given from the radial extent of the notches 6.

On the inner circumference 9 of the base body 2, the base body 2 is cut through in the axial direction by a material opening 10 approximately in the eight-o'clock position. This material opening 10 enables a distance measurement in the axial direction with respect to the contact surface of the clamping disk 10. On the outer circumference 5, the base body 2 further has a radially outward extending positioning tab 12. The positioning tab 12 is arranged at the six-o'clock position. The positioning tab 12 and the material opening 10 are arranged at a defined angular position relative to each other.

Opposite the positioning tab 12, the inner circumference 9 of the base body 2 has a flattened section 14. By means of this flattened section 14, a relatively simple disassembly of the clamping disk 1 from the support is made possible. Using a suitable tool, the clamping disk 1 is lifted at the flattened section 14, so that the positioning tab 12 can be pulled out from the complementary recess.

From the cross section shown in FIG. 2 of a camshaft adjusting unit 15, the position of the mounted clamping disk 1 according to FIG. 1 is visible. The camshaft adjusting unit 15 has a stator 17 in which a rotor 19 is supported so that it can rotate. The stator 17 has a side cover 20 and a sealing cover 21. The stator 17 and rotor 19 rotate together relative to a central axis 22.

The side cover 20 has a borehole 23 by means of which a not-shown camshaft can be held. For the assembly of the camshaft adjusting unit 15, another borehole 24 is inserted into the sealing cover 21. By means of this borehole 24, a central screw is inserted that can be rotated into a threaded borehole on the end face of the camshaft. By rotating the central screw, the camshaft adjusting unit 15 is screwed as a whole against the end face of the camshaft.

On the side of the rotor 19 facing the camshaft, a clamping disk 1 similar to FIG. 1 is mounted. When screwing in the central screw, a normal force is generated on the contact surfaces between the rotor and clamping disk on one side and between the clamping disk and end face of the camshaft on the other side. Through this normal force, a non-positive or friction-fit connection of the rotor 19 to the end face of the camshaft is realized, wherein the clamping disk 1 is inserted in a friction-increasing manner between the rotor 19 and the camshaft.

It can be seen that the outer diameter visible in FIG. 2 of the clamping disk 1 is greater than the inner diameter of the borehole 23 of the side cover 20. For assembly, the clamping disk 1 is inserted while bent via the borehole 23. The clamping disk 1 thus locks in a captive manner behind the undercut 28 of the side cover 20.

The inner circumference 9 of the base body 2 of the clamping disk 1 extends radially over the inner circumference of the rotor 19. A camshaft-side distance measurement to the surface of the rotor 19 is thus not possible. For this reason, the base body 2 of the clamping disk 1 has a notch 10 on its inner circumference 9, so that access to the surface of the rotor 19 is created for a measuring sensor 30.

For a correct angular positioning of the clamping disk 1 relative to the camshaft adjusting unit 15, the base body has a positioning tab 12 corresponding to FIG. 1. This positioning tab 12 is inserted into a corresponding recess onto axially projecting sections 27 of the rotor 19.

In FIG. 3, a detailed view of the material opening 10 of the base body 2 is shown in a cross section perpendicular to the central axis 22. It can be seen that the measuring sensor 30 passes through the material opening 10, in order to be able to determine the distance to the surface of the rotor 19. Corresponding to FIG. 3, a positioning tab 12 of the base body 2 is arranged at the same angular position as the material opening 10. It is clear that such a variant has no material weakening in the base body 2.

The radially outward extending positioning tab 12 of the base body 2 enters, in the assembled state, into a recess 31 of the axially projecting section 27 of the rotor 19.

LIST OF REFERENCE SYMBOLS

1 Clamping disk
2 Base body
4 Hard surface
5 Outer circumference
6 Notches
7 Largest circumscribing diameter
9 Inner circumference
10 Material opening
12 Positioning tab
14 Flattened section
15 Camshaft adjusting unit
17 Stator
19 Rotor
20 Side cover
21 Sealing cover
22 Central axis
23 Borehole
24 Borehole
27 Section
28 Undercut
30 Measuring sensor
31 Recess

The invention claimed is:

1. Clamping disk for the non-positive connection of components in a camshaft adjustment system, with an essentially circular ring-shaped base body that has at least one friction surface for a contact partner, the base body is penetrated in an axial direction by a material opening, and comprising a positioning that is arranged in a specified angular position relative to the material opening, wherein the base body comprises, for disassembly, a flattened section arranged opposite the positioning on the inner circumference.

2. Clamping disk according to claim 1, wherein the material opening is constructed as a notch on the inner circumference of the base body.

3. Clamping disk according to claim 1, wherein the positioning is constructed as a positioning tab.

4. Clamping disk according to claim 3, wherein the positioning tab extends radially outward on the outer circumference.

5. Clamping disk according to claim 2, wherein the notch and the positioning tab extending radially outward are arranged at a same angular position on the base body.

6. Camshaft adjusting unit according to claim 1, wherein the rotor overlaps the clamping disk at least in some sections in the axial direction and that the radially outward extending positioning tab of the clamping disk is inserted into a recess of the overlapping section of the rotor.

7. Camshaft adjusting unit according to claim 6, wherein the stator comprises, on the camshaft side, a side cover with an axial borehole for holding the camshaft, that the inner diameter of the borehole is smaller than the largest circumscribing outer diameter of the clamping disk, and that the clamping disk is inserted into an undercut of the side cover in a captive manner.

8. Method for checking the assembly of a clamping disk according to claim 1, wherein in a camshaft adjusting unit for an internal combustion engine, with a rotor that is mounted so that it can rotate within a stator, wherein a clamping disk is positioned on a side of the rotor facing the camshaft comprising the steps:
- angular alignment of the camshaft adjusting unit,
- camshaft-side placement of the clamping disk on the rotor,
- camshaft-side measurement of a difference in distance between a surface of the clamping disk and a surface of the rotor determined through the material opening,
- comparison of the measured difference in distance with a desired thickness of the clamping disk, and
- separating out the camshaft adjusting unit if it is determined that the difference in distance deviates from the desired thickness outside of a tolerance value.

9. Method according to claim 8, wherein the clamping disk is placed with reference to the positioning mechanism with a defined angular position relative to the rotor.

10. Method according to claim 8, wherein the difference in distance is measured through the borehole of the side cover by a measuring sensor oriented in the angular position.

11. Camshaft adjusting unit for an internal combustion engine, with a rotor that is mounted so that it can rotate within a stator, wherein a clamping disk with an essentially circular ring-shaped base body that has at least one friction surface for a contact partner, the base body being penetrated in an axial direction by a material opening, is positioned on a side of the rotor facing the camshaft.

12. Camshaft adjusting unit according to claim 11, wherein the inner diameter of the rotor is greater than the inner diameter of the base body of the clamping disk or is not freely accessible at least on the camshaft side.

13. Camshaft adjusting unit according to claim 11, wherein the material opening of the clamping disk is freely accessible on the camshaft side.

14. Clamping disk for the non-positive connection of components in a camshaft adjustment system, with an essentially circular, closed, ring-shaped base body that has at least one friction surface for a contact partner, the base body is penetrated in an axial direction by a material opening.

* * * * *